United States Patent
Ghose et al.

(10) Patent No.: US 9,420,424 B2
(45) Date of Patent: Aug. 16, 2016

(54) SYSTEM AND METHOD FOR MEASURING THE CROWDEDNESS OF PEOPLE AT A PLACE

(71) Applicant: Tata Consultancy Services Limited, Mumbai, Maharashtra (IN)

(72) Inventors: Avik Ghose, West Bengal (IN); Anirban Dutta Choudhury, West Bengal (IN); Chirabrata Bhaumik, West Bengal (IN); Arpan Pal, West Bengal (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 14/408,744

(22) PCT Filed: Jun. 17, 2013

(86) PCT No.: PCT/IN2013/000372
§ 371 (c)(1),
(2) Date: Dec. 17, 2014

(87) PCT Pub. No.: WO2014/024209
PCT Pub. Date: Feb. 13, 2014

(65) Prior Publication Data
US 2015/0304815 A1 Oct. 22, 2015

(30) Foreign Application Priority Data
Aug. 9, 2012 (IN) .......................... 2287/MUM/2012

(51) Int. Cl.
*H04W 24/00* (2009.01)
*H04W 4/02* (2009.01)
(Continued)

(52) U.S. Cl.
CPC .............. *H04W 4/023* (2013.01); *H04W 4/008* (2013.01); *H04W 4/043* (2013.01); *H04L 61/6022* (2013.01); *H04W 4/028* (2013.01); *H04W 4/04* (2013.01)

(58) Field of Classification Search
None
See application file for complete search history.

(56) References Cited

U.S. PATENT DOCUMENTS 7,742,769 B2 6/2010 Goodman
7,774,001 B2 8/2010 Richey et al.
(Continued)

OTHER PUBLICATIONS

Thiago Teixeira, Gershon Dublon and Andreas Savvides; "A Survey of Human-Sensing: Methods for Detecting Presence, Count, Location, Track, and Identity", ACM Computing Surveys, 2011 vol. V, No. N; 35 pages.

(Continued)

*Primary Examiner* — Erika A Washington
(74) *Attorney, Agent, or Firm* — Shumaker, Loop & Kendrick, LLP

(57) ABSTRACT

A method, system and apparatus for determining crowdedness at a location, using a first portable communication device having a proximity sensor, wherein the location of a first user is determined using the first portable communication device having an application installed on a memory module thereof, wherein the application is configured to connect to a location sensor embedded in the first portable communication device. The method and system further comprises sensing and identifying a second portable communication device in vicinity of the first user, followed by transmitting a media access control address (MAC address) of the identified second portable communication device to a remote fusion server. Further removing redundancies pertaining to the identified second portable communication device based on the MAC address received by the remote fusion server using a fusion algorithm to determine the crowdedness at the determined location.

15 Claims, 5 Drawing Sheets

(51) Int. Cl.
*H04W 4/00* (2009.01)
*H04W 4/04* (2009.01)
*H04L 29/12* (2006.01)

(56) References Cited

U.S. PATENT DOCUMENTS

| | | |
|---|---|---|
| 7,944,358 B2 | 5/2011 | Sorensen et al. |
| 8,280,617 B2 | 10/2012 | Young et al. |
| 8,442,807 B2 | 5/2013 | Ramachandran |
| 8,457,408 B2 | 6/2013 | Challa |
| 8,483,669 B2 | 7/2013 | Manolescu et al. |
| 8,676,668 B2 | 3/2014 | Wolfe |
| 2004/0203746 A1 | 10/2004 | Knauerhase et al. |
| 2008/0235058 A1 | 9/2008 | Friedman et al. |
| 2009/0118002 A1 | 5/2009 | Lyons et al. |
| 2010/0316253 A1 | 12/2010 | Yang et al. |
| 2010/0331017 A1 | 12/2010 | Ariga |
| 2012/0046068 A1 | 2/2012 | Katpelly et al. |
| 2012/0150490 A1 | 6/2012 | Oyabu et al. |

OTHER PUBLICATIONS

Jens Weppner, Paul Lukowicz; "Collaborative Crowd Density Estimation with Mobile Phones"; Embedded Systems Lab (ESL), University of Passau; Nov. 1, 2011; 5 pages.

Nicholas D. Lane, Emiliano Miluzzo, Hong Lu, Daniel Peebles, Tanzeem Choudhury, and Andrew T. Campbell; "A Survey of Mobile Phone Sensing"; IEEE Communications Magazine Sep. 2010; 11 pages.

International Search Report of corresponding International Application No. PCT/IN2013/00372; dated Nov. 29, 2013; 2 pages.

SYSTEM AND METHOD FOR MEASURING THE CROWDEDNESS OF PEOPLE AT A PLACE

CROSS-REFERENCE TO RELATED APPLICATIONS AND PRIORITY

The present application claims priority from Indian Patent Application No. 2287/MUM/2012 filed on Aug. 9, 2012 and from PCT/IN2013/000372 filed on Jun. 17, 2013, the entirety of which is hereby incorporated by reference.

FIELD OF INVENTION

The present invention relates to estimation of crowd. More particularly, the present invention relates to a method, a system and an apparatus for determining the crowdedness of people in a desired area using a portable communication device.

BACKGROUND OF THE INVENTION

Urban planning plays a very important role in growth and sustainability of a city. The critical factor that affects the urban planning is population density and distribution. The infrastructure or places accessed by the public are needed to be optimized for crowd management so that crowd control is possible in case of emergency or otherwise. The estimation of crowd or population density at places such as train or bus stations help detect the peak period, and thereby helps in optimizing train schedule or bus schedule for easy distribution and dispersion of people. Some of the existing method and systems known to us are as follows:

EP2000962 by Raymond et al., discloses a method and system for estimating people at a location using mobile phones device. The method of estimating a number of people comprises counting a first group of people at a first location using a mechanical means as to obtain a first number; simultaneously counting at the first location the number of Bluetooth enabled mobile communication devices in the first group of people so as to obtain a second number. Determining the ratio of the first number and second number, further counting at a second location, the number of Bluetooth enabled communication devices so as to obtain a third number and using the ratio estimate the number of people at the second location. The disclosure further teaches that to maintain privacy of users of participating mobile communication device identification data is not captured or transmitted to a central server.

U.S. Pat. No. 7,742,769 by William D. Goodman discloses a method and apparatus for providing the number, distribution of people or devices in a geographic region based on active wireless device counts. Wireless communications centres report the number and types of active devices in the geographic region serviced by the wireless communications centre and indicate the number of devices in the serviced region. The active wireless device information related to a targeted geographical area is captured. The population counts are extrapolated from the device information for the targeted geographic areas. Traffic flow information is generated from changes in the device counts or population estimates over a time based on information of active devices in a region. The disclosure teaches use of cellular network which is usually hexagonal to detect the location of the device.

Weppner et al. in "Collaborative Crowd Density Estimation with Mobile Phones" discloses a method for crowd estimation using a Bluetooth at a location. However, the disclosure teaches the use of Bluetooth only for proximity detection and is based on assumption that each person will have only one device. The paper is silent on the location detection method thereof.

From the above-cited reference, there is a long felt need for a method, system and apparatus which estimates a number of people at a location detected using a portable communication device, both in an open and a closed loop. The existing disclosures for crowd estimation are limited to either work in a closed loop, e.g. bus or trains, or open loop, e.g. bus station or shopping malls. This limitation reduces their versatility. A plurality of systems and methods cited above either use only Bluetooth to detect crowdedness or other mechanical means in conjugation with Bluetooth, wherein the mechanical means are stationary, thereby limiting the usability.

SUMMARY OF THE INVENTION

Before the present apparatus, method and system is described, it is to be understood that the disclosure for estimation of crowdedness at a location is not limited to the apparatus, system and methodologies described, as there can be multiple embodiments of the present disclosure, which are not expressly illustrated. It is also to be understood that the terminology used in the description is for the purpose of describing an embodiment, and is not intended to limit the scope of the present disclosure. The principal object of the present invention is to provide a method, system, and apparatus for determining the crowdedness of people at a location, using a portable communication device.

Another object of the present invention is to provide a method, system, and apparatus for counting the number of people at a location using a portable communication device.

Yet another object of the present invention is to provide a method, system, and apparatus for estimating crowdedness at a location using proximity sensors at a pre-defined time interval and transmit the captured crowdedness to a remote fusion server.

Still another object of the present invention is to provide a method, system, and apparatus for fusing the result or data or information obtained, on crowdedness, from portable communication device for estimation and extrapolation of the population at the location.

In one aspect of the present disclosure a method, system, and apparatus is provided which enables estimation of crowdedness at a location or point of interest using a mobile communication device. An application embedded in the mobile communication device captures the data pertaining to estimation of crowdedness using various sensors mounted on the portable communication device.

In another aspect of the present disclosure a plurality of non stationary proximity sensors are used to detect other devices in vicinity and the numbers of detected devices data is then computed to determine the crowdedness.

In another aspect the present disclosure uses various sensors mounted in the portable communication device such as accelerometer, gyroscope or GPS in conjugation with the proximity sensors.

In another aspect of the present disclosure, position or location sensors are used to determine the location of a user using the portable communication device. When the detected location matches a pre-defined location stored in the application, data pertaining to the crowd estimation is captured and transmitted to a remote fusion server.

In yet another aspect of the present disclosure, a method is disclosed for determining crowdedness at a location, using a first portable communication device having a proximity sensor. Wherein the method comprises determining the location of a first user using the first portable communication device having an application installed on a memory module thereof, wherein the application is configured to connect to a plurality of location sensors embedded therein the first portable communication device, sensing and identifying a second portable communication device in vicinity of the first user at said location using the proximity sensor of the first portable communication device. The method further comprises of transmitting a media access control address (MAC address) of the identified second portable communication device to a remote fusion server using a communication means of said first portable communication device and removing redundancies pertaining to the identified second portable communication device based on the MAC address received by the remote fusion server using a fusion algorithm to determine the crowdedness at the determined location.

In still another aspect of the present disclosure a system is disclosed for determining crowdedness at a location, the system comprising a fusion server comprising a data reception module and a data processing unit to derive a probabilistic count approximation, a first portable communication device, having an application embedded therein to cause location determination, devices information aggregation and transmission of said information, communicatively coupled with the remote fusion server using a communication means. The system further comprises of a proximity sensor mounted thereon the first portable communication device and is operably coupled with said application, wherein the proximity sensor is adapted to sense and identify MAC address of a second portable communication device in vicinity thereof and a location sensor embedded in the first portable communication device that enables location determination.

BRIEF DESCRIPTION OF DRAWINGS

The foregoing summary, as well as the following detailed description of preferred embodiments, is better understood when read in conjunction with the appended drawings. Drawings and illustrations described herein are intended to lay more emphasis on understanding the underlying principle of the present disclosure. The manner in which the drawings are presented in no way limit the scope of the disclosure and the advantages one can garner from the embodiments of the present invention.

DETAILED DESCRIPTION

Some embodiments of this invention, illustrating its features, will now be discussed:

It must also be noted that as used herein and in the appended claims, the singular forms "a," "an," and "the" include plural references unless the context clearly dictates otherwise. Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

The present disclosure enables crowd estimation using a portable communication device in a closed loop system or open loop system. An example of a closed loop system is a bus or train wherein the elements in the system, i.e. people, do not enter or exit the system for a range of time period, whereas an open loop system can be illustrated by a bus station where the elements in the system, i.e. people, are more dynamic i.e. they often exit and enter the system. The portable communication device in the present disclosure is configured to capture the location of user and device using an application that is embedded on the memory module.

The embedded application enables a user to either manually or automatically control the access to various sensors on the portable communication device. The application also enables location detection, and when the detected location matches the pre-defined location stored in the application or embedded in the GIS of the application, the application uses the communication means and transmits the captured data to a remote fusion server. Having the application enables optimize the battery usage and the data usage of the portable communication device. The application further reduces the load and the data dump on the remote fusion server as the application pre-processes the data captured and only transmits the aggregated data.

The captured data that pertains to estimation of crowdedness at the determined location is captured using the various sensors which include global positioning system (GPS), accelerometer, gyroscope, Bluetooth, and Wi-Fi. The data is captured by and for "enabled devices". The "enabled devices" refer to devices that are capable of transmitting a communication signal, such as an identification signal, and that such devices may be active, in stand-by mode or, in some instances, even be switched off.

The portable communication device in the present disclosure refer to a mobile ("cellular") telephone apparatus, such as GSM or UMTS telephones, portable consumer devices having (wireless) communication facilities, PDA's (Personal Digital Assistants), portable computers such as laptop or notebook or tablets.

Crowdedness in the present disclosure refers to density of people.

Figure 1:
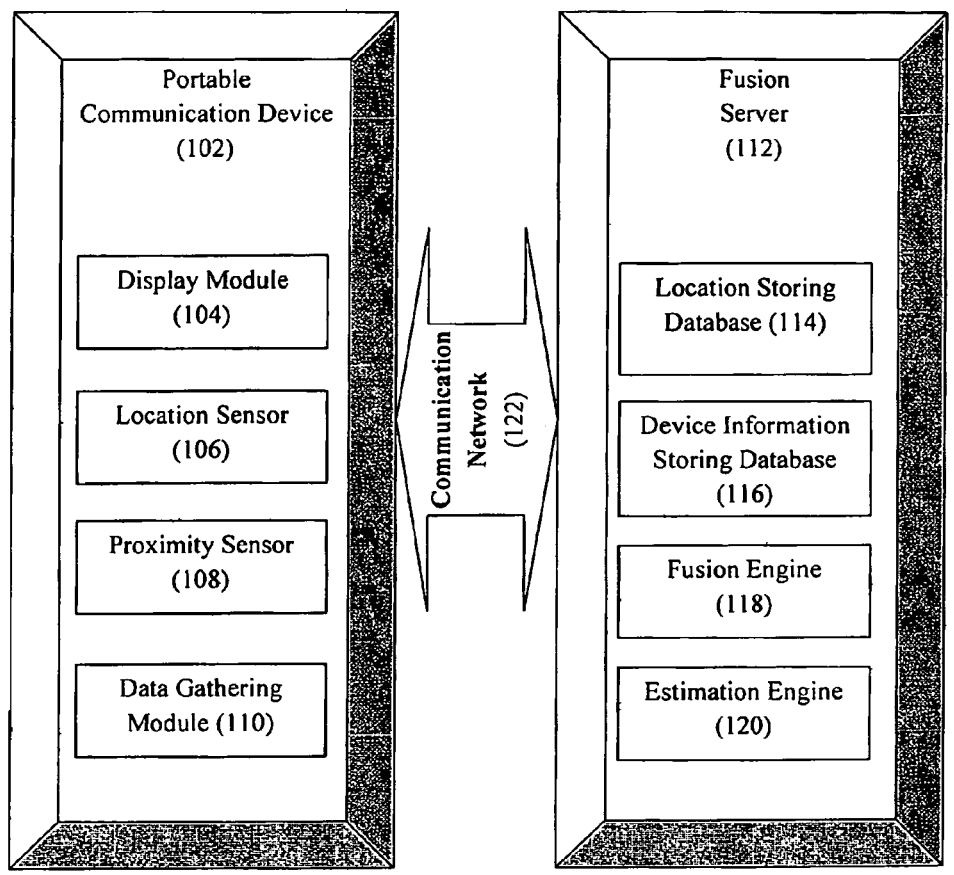
FIG. 1, illustrates a system for measuring density of people at a location, according to an exemplary embodiment.

FIG. 1, illustrates a system for measuring density of people or crowdedness at a location, according to an exemplary embodiment the system (100) comprises a portable communication device (102) and a remote fusion server (112).

The portable communication device (102) comprises of a display module (104) that is configured to render aggregated device information and a plurality of data retrieved from the remote fusion server (112) by an application embedded on a data gathering module (110) in the portable communication device (102). At least one location sensor (106) that is adapted to capture and transmit information pertaining to a current location of a user. The information captured by the location sensor (106) is stored in the data gathering module (110) and mapped and compared against a pre-defined point-of-interest list. According to an embodiment the pre-defined point-of-interest list is stored on the data gathering module (110) which can be updated real-time or as desired. When the capture current location information matches the pie-defined point-of-interest list, the information is transmitted to the remote fusion server (112). At least one proximity sensor (108) adapted to sense and identify another portable communication device in the vicinity of the said portable communication device (102).

The portable communication device (102) is communicably connected by means of communication means using a communication network (122) to the remote fusion server (112). The communication network (122) can be a wired communication network or wireless communication network using the radio wave for communication.

The remote fusion server (112) comprises of a location storing database (114) that is adapted to store the location information transmitted by the user having the application and further to store geo-tagged information of a plurality of other users captured from various website, that matches the at least one location from the pre-defined list of point-of-interest. According to an embodiment the pre-defined point of interest list can be stored location storing database (114) and can be updated real-time or as desired. A device information storing database (116) is adapted to store the transmitted information pertaining to the identified device information captured by the proximity sensors (108) of the portable communication device (102). In an exemplary embodiment at certain location there can be more than one device having the embedded application, therefore to capture these multiple information and aggregate them the device information storing database (116) is utilized. A fusion engine (118) is configured to capture to the data stored in location storing database (114) and device information storing database (116). The captured data is mapped with each other and redundant data is eliminated based on the capture MAC ID's of another device sensed and identified in the vicinity. The mapped data of fusion engine (118) is further processed by an estimation engine (120) for a probabilistic count approximation for the crowdedness. The estimation engine (120) translates the number of device count data into corresponding crowdedness data for the people.

According to an embodiment the fusion engine (118) is adapted to capture data pertaining to foot-fall at a pre-defined location and built a statistical model that helps estimation engine (120) in probabilistic count approximation. According to another exemplary embodiment the estimation engine (120) is configured to capture-data pertaining to foot-fall at a pre-defined location and built a statistical model based on the captured data.

In an exemplary embodiment, the location sensor (106) is configured to capture the current location information of the user at a pre-defined interval of time. The location information may be captured in at least two ways: using a GPS/Assisted-GPS (A-GPS) to capture spatial position or communicably receive the location information from an external source like Telecom provider's location API, or Wi-Fi or Ultrasound Beacons from RTLS or combinations thereof.

In an exemplary' embodiment, the data gathering module (110) is configured to store the information of all the devices sensed by the proximity sensor (108). The data gathered in the module may store the information of portable devices like Machine Access Control Identifications (MAC ID's) or Machine Addressor portable device number or name and the like.

In an exemplary embodiment, the location storing database (114) is adapted to store all the information related to the identified location or the captured location. The information may include the location name, location co-ordinates, or name of certain landmark nearby the location and/or combination.

In an exemplary embodiment, the device information storing database (116) is adapted to store all the information of all the sensed portable devices in the vicinity of the user's portable communication device (102). The information may include the total number of devices detected in the vicinity, their Machine Access Control Identifications (MAC ID's) or Machine Address or portable device number.

In an exemplary embodiment, the fusion engine (118) is adapted for fusing all the data stored in the location storing database (114) and the device information storing database (116), in a way that the duplication of data is eliminated in order to provide duplicate free database entries. The databases entries of the fusion engine may include the total number of devices detected in the vicinity, their Machine Access Control Identifications (MAC ID's) or Machine Address or portable device number, without any duplication of the data.

Figure 2:
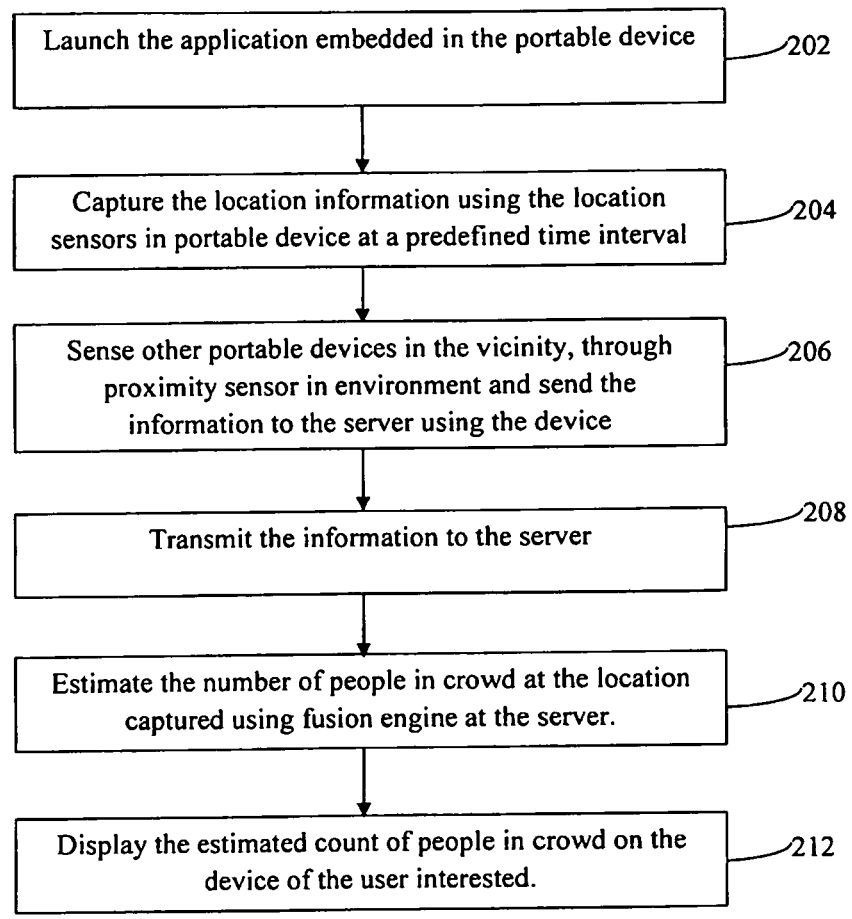
FIG. 2, illustrates a flow diagram for estimating and displaying the count of people according to an embodiment.

FIG. 2, illustrates a flow diagram for estimating and displaying the count of people (200) according to an embodiment.

The flow diagram (200) utilizes the system (100) for estimating and displaying the count of people. The process starts at the step 202, wherein the application embedded in the portable communication device (102) is initiated by launching or loading the application. The application can be launched manually or automatically based on the preference selected or set by a user of the portable communication device (102). At the step 204, current location of the user is detected using the location sensors (106) and then determined whether the detected location matches the pre-defined point-of-interest stored in the data gathering module (110) or GIS of the application. At step 206, after the location is determined the portable device (102) senses and identifies other portable communication devices in the vicinity of the user. The sensing and identifying step 206 uses plurality of proximity sensors (106) of the portable communication device (102). At the step 208, the number of unique portable communication devices identified is transmitted to the remote fusion server (112). At the step 210, the number of people in crowd at a said location is estimated using a fusion engine (118) at the remote fusion server (112). The fusion engine (118) along with estimation engine (120) translates the device data captured into equivalence of crowdedness estimations. The process ends at step 212, in which the determined crowdedness is rendered on display device of interested user.

Figure 3:
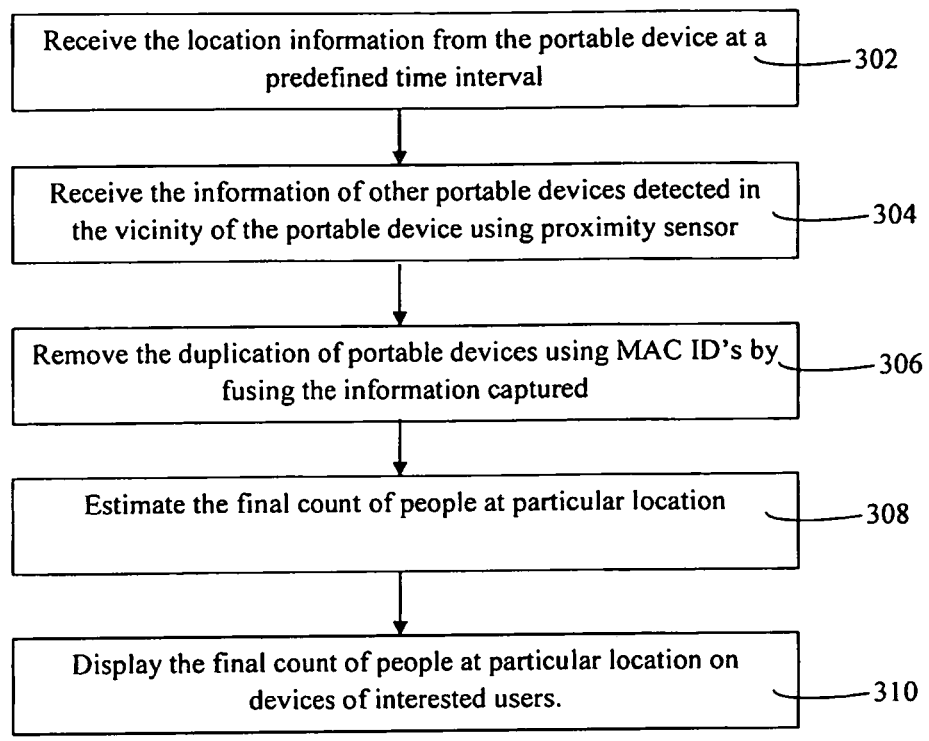
FIG. 3, illustrates a flow diagram showing the working of fusion engine according to an embodiment.

FIG. 3, illustrates a flow diagram showing the working of fusion engine (300) according to an embodiment.

Figure 4:
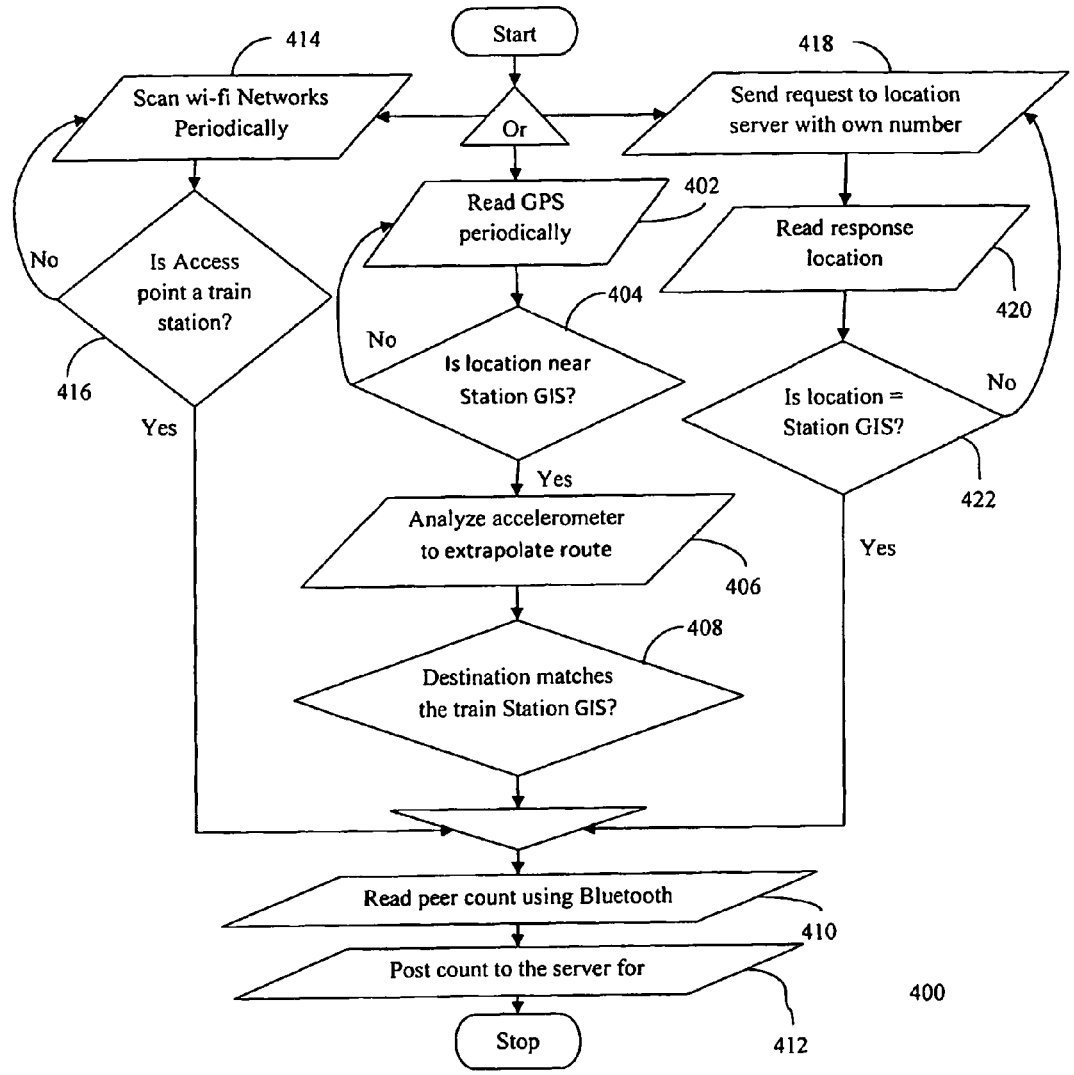
FIG. 4, illustrates a flow diagram, for determining the location of the user according to an exemplary embodiment.

The process starts at the step 302, with transmission of information pertaining to the current or present location of the user of the portable commutation device from step 208 of FIG. 2, at a predefined time interval which is received by the remote fusion server. At the step 304, the information of other portable devices, sensed in the vicinity of the portable devices using a plurality of proximity sensors, as explained in step 206 for FIG. 2, is received by the server. At the step 306, all the information received at step 302 and 304, is fused inside a fusion engine and the redundancies in the captured information of portable communication devices is removed based on a Machine Access Control Identifications (MAC ID's). At the step 308, the final count of the people at the particular location is estimated. The process ends at step 310, by displaying the final count of the people at the particular location on the devices of the interested users, as explained in the step 212 of FIG. 2:

FIG. 4, illustrates a flow diagram, for determining the location of the user according to an exemplary embodiment.

According to the exemplary embodiment the system (100) is used for determining a train station. The process for determining a train station 400 using the portable communication device (102) begins by capturing the current location using the location sensor (106). The location sensor (106) like a Global Positioning System (GPS) that periodically captures location data at a predefined time interval 402, or a Wi-Fi sensor that periodically scans for available Wi-Fi network to detect the location 414, is used. Further a periodical request from the portable communication device sent to a communication server over the communication network (122) can also be used to determine the current location. If the current location data captured matches train station 404, 416, and 420, the application starts capturing and storing the data in the data gathering module (110) of the portable communication device (102). The steps 402 or 414 or 418 can also be carried out simultaneously for better precision and efficiency.

If a negative feedback is received after the execution of steps 402 or 414 or 418 the process is re-routed to initiate again, the iteration continues until a positive feedback is received.

In case of step 404 if feedback received is positive the process flows to next step 406, wherein a route of the user is analyzed using an accelerometer sensor mounted in the portable communication device (102). And for the steps 416, 422 the process flows to step 410. Based on the data captured from the accelerometer and the data stored in the data gathering module (110) pertaining to the current location, the location is re-verified to be train station and the process is channeled to next step 410.

In the step 410 the data gathering module (110) captures the MAC Id's of other enabled portable communication devices in the vicinity using proximity sensors (108). The proximity sensors like Bluetooth sense and identify other enabled devices in the vicinity. The application enables the proximity sensors (108) to be synchronously receptacle to other enabled devices.

The data gathering module (110) removes the redundant device entries and transmits the data of the unique devices to the fusion server (112) 412, placed remotely, over the communication network (122) of the portable communication device (102). The fusion server (112) complies data from the location storing database (114), and device information storing database (116) using the fusion engine (118). The estimation engine uses the complied data for measuring crowdedness at the train station.

The above disclosed exemplary embodiment for determining the train station is also best suited to an open loop system like a bus station, or a shopping mall.

Figure 5:
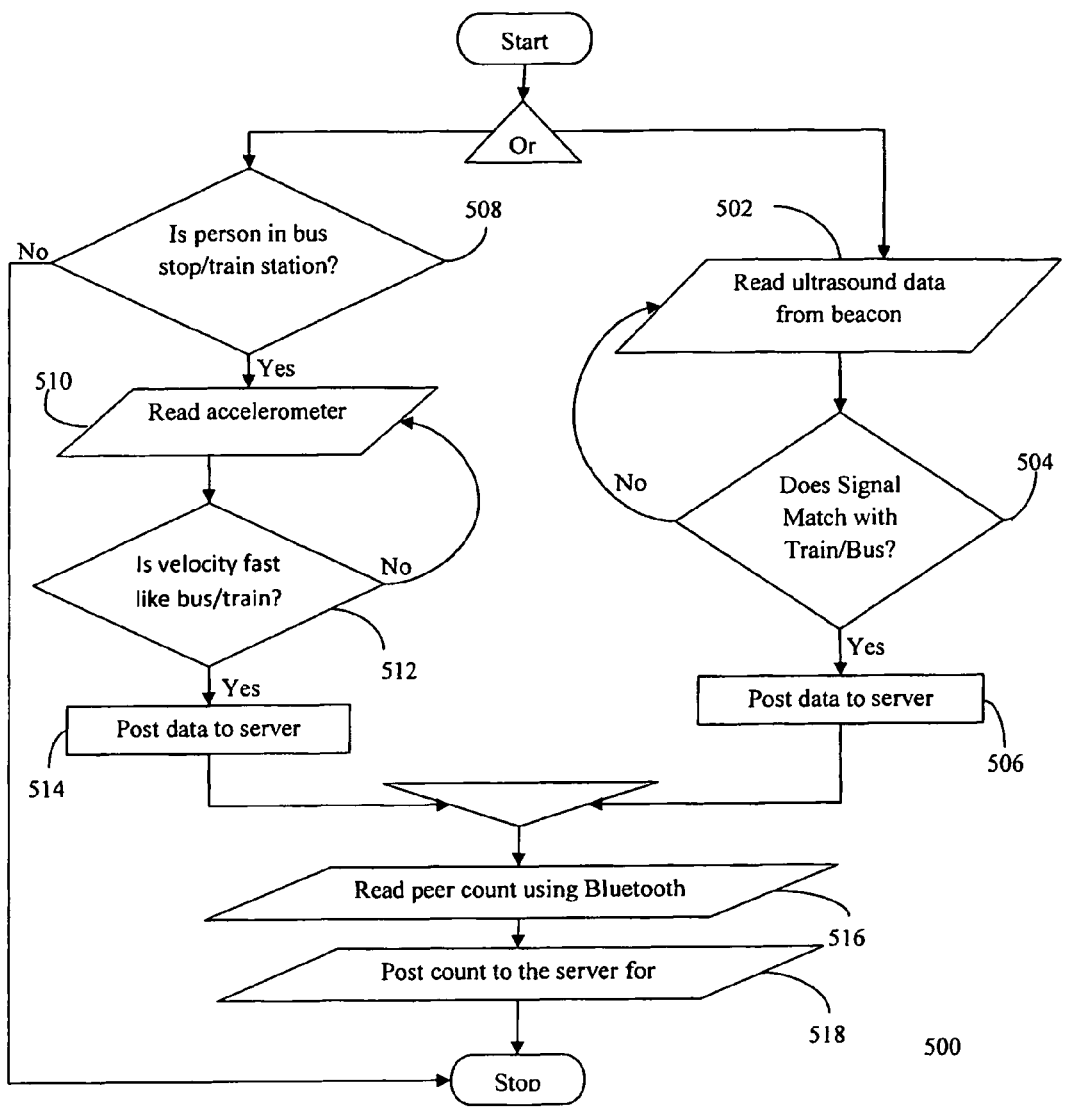
FIG. 5, illustrates a flow diagram, according to another exemplary embodiment for detecting location.

FIG. 5, illustrates a flow diagram, according to another exemplary embodiment for detecting location.

According to the exemplary embodiment the system (100) is used for determining location like a bus. The process for determining a bus location 500 using the portable communication device (102) begins by capturing the current location using the location sensor (106). The location sensor (106) like a Global Positioning System (GPS) that periodically captures location data at a predefined time interval 508, or a signal captured from a beacon which uses Real Time Locating System (RTLS) 502, is used. Further based on the method for determining the current location either velocity of the user is captured using the accelerometer mounted in the portable communication device (102) or a signal from the beacon is captured which contains the location data embedded in the signal. When the location data from the signal matches the bus, data is transmitted to the remote fusion server (112), 406.

Further the velocity of the user is detected to be higher, the last current location of the user is retrieved from the data gathering module (110) or from the location storing database (114). When the last current location matches a bus station and velocity captured is higher the application transmits the information to the remote fusion server (112) 514.

In the step 516 the data gathering module (110) captures the MAC Id's of other enabled portable communication devices in the vicinity using proximity sensors (108). The proximity sensors like Bluetooth sense and identify other enabled devices in the vicinity. The data gathering module (110) removes the redundant device entries and transmits the data of the unique devices to the fusion server (112) 518, placed remotely, over the communication network (122) of the portable communication device (102). The fusion server (112) complies data from the location storing database (114), and device information storing database (116) using the fusion engine (118). The estimation engine uses the complied data for measuring crowdedness in the bus.

The above disclosed exemplary embodiment for determining bus is also best suited to a close loop system like a train, or a taxi.

The present disclosure helps to estimate crowdedness of people at any location using existing set-up of portable communication device, thereby reducing the cost of infrastructure. The system may be scaled-up or scaled-down for estimating-crowdedness at a location without re-investing in the infrastructure substantively. The use of pre-dominantly existing sensors reduces the initial and working cost of the system. The discourse enables the use of the method and system both in a closed loop system where the elements in the system stay constant over a longer period and an open loop system where there are dynamic changes of elements.

We claim:

1. A method for determining crowdedness at a location, using a first portable communication device having a proximity sensor, the method comprising:
   determining the location of a first user using the first portable communication device having an application installed on a memory module thereof, wherein the application is configured to connect to a plurality of location sensors embedded therein the first portable communication device;
   identifying whether the determined location of the first user is a public location or a closed loop environment, wherein the public location is determined by the application by:
      accessing the location sensors selected from an available Wi-Fi network or global positioning system (GPS) or location server or combination thereof at a predefined interval of time;
      extrapolating a route using an accelerometer embedded in the portable communication device; and
      determining the location by mapping the extrapolated route with the location sensors;
   sensing and identifying a second portable communication device in vicinity of the first user at said location using the proximity sensor of the first portable communication device;
   transmitting a media access control address of the identified second portable communication device to a remote fusion server of the first portable communication device;
   removing redundancies pertaining to the identified second portable communication device based on the media access control address received by the remote fusion server using a fusion algorithm to determine the total number of devices detected in the vicinity; and
   estimating the crowdedness at the location using probabilistic count approximation based on the total number of devices detected in the location.

2. The method of claim 1, further comprising capturing geo-tagged information of a plurality of other users from a plurality of pre-defined sources corresponding to the determined location and mapping with respect to the first user.

3. The method of claim 1, wherein a first constant for compensating uncertainty of identified second devices is determined by taking a ratio of number of devices present at the location to an empirical value of number of devices believed to be present at the location.

4. The method of claim 1, wherein the fusion algorithm further comprises multiplying a determined device count with a first constant and adding a second constant to the product, wherein the second constant determined by historical data collected for a defined time period by running the application in a closed loop environment for a plurality of iterations.

5. The method for determining the location of the first user of claim 1, wherein the public location comprises of a train station or a bus station or a taxi stand or a shopping mall.

6. The method for determining the location of claim 1, wherein the location being inside a train or a bus or the closed loop environment is determined using a method comprising:
 retrieving a last location of the first user from the remote fusion server;
 capturing velocity of the first user using an accelerometer embedded in the portable communication device or an ultrasound data from a beacon;
 transmitting the captured velocity or ultrasound data to the remote fusion server; and
 determining the location by mapping the last location retrieved with the transmitted captured velocity or ultrasound data.

7. A system for determining crowdedness at a location, the system comprising:
 at least one first portable communication device, having an application embedded therein configured to determine location, devices information aggregation and transmission of said information, communicatively coupled with a remote fusion server;
 a proximity sensor mounted thereon the first portable communication device and is operably coupled with said application, wherein the proximity sensor is adapted to sense and identify media access control (MAC) address of a second portable communication device in vicinity thereof;
 a plurality of location sensors embedded in the first portable communication device that enables location determination, wherein a public location is identified by extrapolating a route using an accelerometer embedded in the first portable communication device and mapping the extrapolated route with the plurality of location sensors; and
 the remote fusion server comprising of a data reception module and a data processing module configured to:
  identify the total number of devices present in the location by removing redundancies pertaining to the identified second portable communication device based on the MAC address received by the data reception module; and
  estimate crowdedness at the location using probabilistic count approximation based on the total number of devices identified in the vicinity.

8. The system of claim 7, wherein the proximity sensor is a wireless technology enabled sensor.

9. The system of claim 7, wherein the plurality of location sensors is selected from a global positioning system, an ultrasound beacon, a Wi-Fi network, or any combination thereof.

10. The system of claim 7, further comprises a fusion algorithm installed on the remote server configured to analyze the capture data pertaining to the at least one second portable communication device.

11. The system for determining the location of the first portable communication device of claim 7, wherein the public location comprises of a train station or a bus station or a taxi stand or a shopping mall.

12. An apparatus for estimating the crowdedness at a location, the apparatus comprising:
 an application embedded on a memory module of a portable communication device configured to cause the device to be a synchronous receptacle to a plurality of devices in a vicinity thereof;
 at least one proximity sensor mounted on the portable communication device and is operatively coupled to said application;
 at least one location sensor mounted on the portable communication device configured to detect a spatial position of the portable communication device and to communicably receive a position information from an external source, wherein a public location is identified by extrapolating a route using an accelerometer embedded in the portable communication device and mapping the extrapolated route with the location sensor;
 at least one computation engine in said portable communication device configured to remove redundancies in sensed devices in the proximity in a predefined time frame;
 a communication device configured to transmit a media access control (MAC) address of the sensed devices; and
 a remote computation device configured to receive the MAC address of the sensed devices for estimating the crowdedness of the location, wherein the remote computation device uses probabilistic count approximation technique to estimate crowdedness of the location.

13. The apparatus of claim 12, wherein the at least one computation engine is a fusion engine.

14. The apparatus of claim 12, further comprising a communication interface in the portable communication device configured to establish communication between the portable communication device and at least one server for transmitting accumulated media access control addresses of the sensed devices.

15. The apparatus for determining the location of the portable communication device of claim 12, wherein the public location comprises of a train station or a bus station or a taxi stand or a shopping mall.

* * * * *